(12) United States Patent
Nagumo

(10) Patent No.: US 9,825,509 B2
(45) Date of Patent: Nov. 21, 2017

(54) ROTATING ELECTRICAL MACHINE

(71) Applicant: HONDA MOTOR CO., LTD., Tokyo (JP)

(72) Inventor: Toshiyuki Nagumo, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 422 days.

(21) Appl. No.: 14/389,276

(22) PCT Filed: Mar. 18, 2013

(86) PCT No.: PCT/JP2013/057694
§ 371 (c)(1),
(2) Date: Sep. 29, 2014

(87) PCT Pub. No.: WO2013/146433
PCT Pub. Date: Oct. 3, 2013

(65) Prior Publication Data
US 2015/0061426 A1 Mar. 5, 2015

(30) Foreign Application Priority Data

Mar. 30, 2012 (JP) .................................. 2012-081172

(51) Int. Cl.
*H02K 9/02* (2006.01)
*H02K 11/00* (2016.01)
(Continued)

(52) U.S. Cl.
CPC ........... *H02K 11/0005* (2013.01); *H02K 3/52* (2013.01); *H02K 3/522* (2013.01); *H02K 5/225* (2013.01);
(Continued)

(58) Field of Classification Search
CPC .. H02K 3/32; H02K 3/38; H02K 5/22; H02K 9/00; H02K 9/19; H02K 7/116
See application file for complete search history.

(56) References Cited

U.S. PATENT DOCUMENTS 7,193,344 B2 * 3/2007 Kabasawa ................ B60K 6/26
180/65.22
8,198,763 B2 6/2012 Kato et al.
2004/0206558 A1 10/2004 Kabasawa et al.

FOREIGN PATENT DOCUMENTS

CN 101317318 A 12/2008
JP 2003-72390 A 3/2003
(Continued)

OTHER PUBLICATIONS

English Machine Translation of AKAO, JP 2008-312324, Dec. 2008.*

(Continued)

*Primary Examiner* — Burton Mullins
(74) *Attorney, Agent, or Firm* — Westerman, Hattori, Daniels & Adrian, LLP

(57) ABSTRACT

A rotating electrical machine is provided with: a plurality of bus bars that provide an electrical relay between an external power line, which is positioned on the outside of a housing, and a multiphase coil; an insulation cover that is mounted on the plurality of bus bars with a prescribed gap between each, and covers at least part of the bottom surface of each bus bar; and a coolant supply means that supplies a cooling fluid, which cools a stator, inside the housing. A through-hole, which vertically penetrates a bottom surface, is formed on the bottom surface of the insulation cover.

13 Claims, 19 Drawing Sheets

(51) Int. Cl.
  *H02K 3/52* (2006.01)
  *H02K 11/27* (2016.01)
  *H02K 11/25* (2016.01)
  *H02K 5/22* (2006.01)
  *H02K 9/19* (2006.01)

(52) U.S. Cl.
  CPC .................. *H02K 9/02* (2013.01); *H02K 9/19* (2013.01); *H02K 11/0094* (2013.01); *H02K 11/25* (2016.01); *H02K 11/27* (2016.01); *H02K 2213/03* (2013.01)

(56) References Cited

FOREIGN PATENT DOCUMENTS

| | | |
|---|---|---|
| JP | 2005-261017 A | 9/2005 |
| JP | 2006-340585 A | 12/2006 |
| JP | 2008-17693 A | 1/2008 |
| JP | 2009-17667 A | 1/2009 |

OTHER PUBLICATIONS

Office Action dated Feb. 14, 2016, issued in counterpart Chinese Patent Application No. 2013800165525, with English translation. (11 pages).
International Search Report dated May 21, 2013 issued in corresponding application No. PCT/JP2013/057694.

* cited by examiner

ROTATING ELECTRICAL MACHINE

TECHNICAL FIELD

The present invention relates to a rotary electric machine (rotating electrical machine) having an insulating cover which can insulate bus bars and be suitably used for a cooling structure.

BACKGROUND ART

Japanese Laid-Open Patent Publication No. 2006-340585 (hereinafter referred to as "JP 2006-340585 A") discloses an electric motor 1 which comprises a terminal 40 electrically connecting coil terminal metal fittings 30a, 30b, 30c with external cables 50a, 50b, 50c, respectively (see FIGS. 1 and 2, and paragraph [0023]). The terminal 40 is an integrated component in which three conductor bars 41a, 41b, 41c each made of a copper plate are molded with a resin part 42 (see paragraph [0023]). Each of the conductor bars 41a, 41b, 41c extends vertically with respect to the electric motor 1 (see FIGS. 1 and 2).

SUMMARY OF INVENTION

As mentioned above, while each of the conductor bars 41a, 41b, 41c of JP 2006-340585 A is arranged extending vertically with respect to the electric motor 1, another arrangement of the conductor bars 41a, 41b, 41c, other than the arrangement in the vertical direction, is not considered in JP 2006-340585 A. Also, an insulation method or cooling structure for another arrangement in which the conductor bars 41a, 41b, 41c are arranged differently is not mentioned at all.

The present invention has been made in view of the aforementioned problems. An object of the present invention is to provide a rotary electric machine that is excellent in insulation and cooling performance.

According to the present invention, a rotary electric machine includes a stator with coils in a plurality of phases wound thereon, a housing that houses the stator therein, a plurality of bus bars configured to electrically join the coils in the plurality of phases and external electric power lines to each other, the external electric power lines disposed outside of the housing, an insulating cover attached to the bus bars with gaps between the bus bars and the insulating cover, and configured to cover at least portions of lower surfaces of the bus bars, and a coolant supply unit configured to supply a cooling fluid for cooling the stator to inside of the housing. A through hole is defined in a bottom surface of the insulating cover and extends vertically through the bottom surface.

According to the present invention, since the insulating cover covers at least portions of lower surfaces of the bus bars, it is possible to improve the insulation between the bus bars and their surrounding components.

Further, since the through hole is formed in the bottom surface of the insulating cover, the cooling fluid can be discharged from the through hole when the cooling liquid enters the insulating cover. Accordingly, the cooling fluid is avoided from remaining in the insulating cover, and a short circuit between the bus bars due to the remaining cooling fluid can be prevented. Also, the insulating cover or the cooling liquid itself can be prevented from being deteriorated due to the remaining cooling fluid.

The bus bars may extend from an outer circumferential side of the stator along an axial direction thereof, and the insulating cover may be disposed between an outer circumferential surface of the stator and the bus bars. Accordingly, the bus bars can be connected to the terminals of the external electric power lines at positions shifted from the stator in the axial direction. Therefore, the dimension of the rotary electric machine along the radial directions can be reduced, rather than a case in which the bus bars are connected to the terminals of the external electric power lines at positions radially outward of the outer circumferential surface of the stator. Also, since the insulating cover is disposed between the outer circumferential surface of the stator and the bus bars, it is possible to improve the insulation between the outer circumferential surface of the stator and the bus bars.

The through hole may be disposed at a position remote from the outer circumferential surface of the stator in the axial direction. Accordingly, it is possible to prevent degradation of the insulation between the outer circumferential surface of the stator and the bus bars due to the formation of the through hole.

The insulating cover may include a partition wall positioned between the bus bars, the bottom surface of the insulating cover may be inclined with respect to a horizontal plane, and the through hole may be positioned at a corner where the partition wall and the bottom surface cross each other. In this structure, since the bottom surface of the insulating cover is inclined with respect to the horizontal plane, it is possible to dispose the insulating cover along the outer circumferential surface of the stator. Therefore, it is possible to prevent the dimension of the rotary electric machine along the radial directions from being increased. Further, since the through hole is positioned at a corner where the bottom surface and the partition wall cross each other, the cooling liquid can be discharged effectively.

The bus bars may be formed of plate-like members, and each of the bus bars may include a bent portion, which is made up of a portion of the plate-like member that is bent in a direction along thickness of the plate-like member. Accordingly, when there is a change in temperature, the bent portions are flexed to absorb extensions and contractions of the bus bars. Therefore, stresses caused in the bus bars when the temperature changes are reduced, thereby preventing the bus bars from becoming damaged.

One of the bus bars may include a stepped portion, which is formed in a height direction, and the through holes of the insulating cover may be formed on upper and lower sides of the stepped portion.

The insulating cover may include a lower cover that covers the lower surfaces of the bus bars, and the insulating cover may be coupled to an upper cover that covers upper surfaces of the bus bars.

DESCRIPTION OF EMBODIMENTS

A. Embodiment

1. Description of Overall Arrangement
[1-1. Overall Arrangement]

Figure 1:
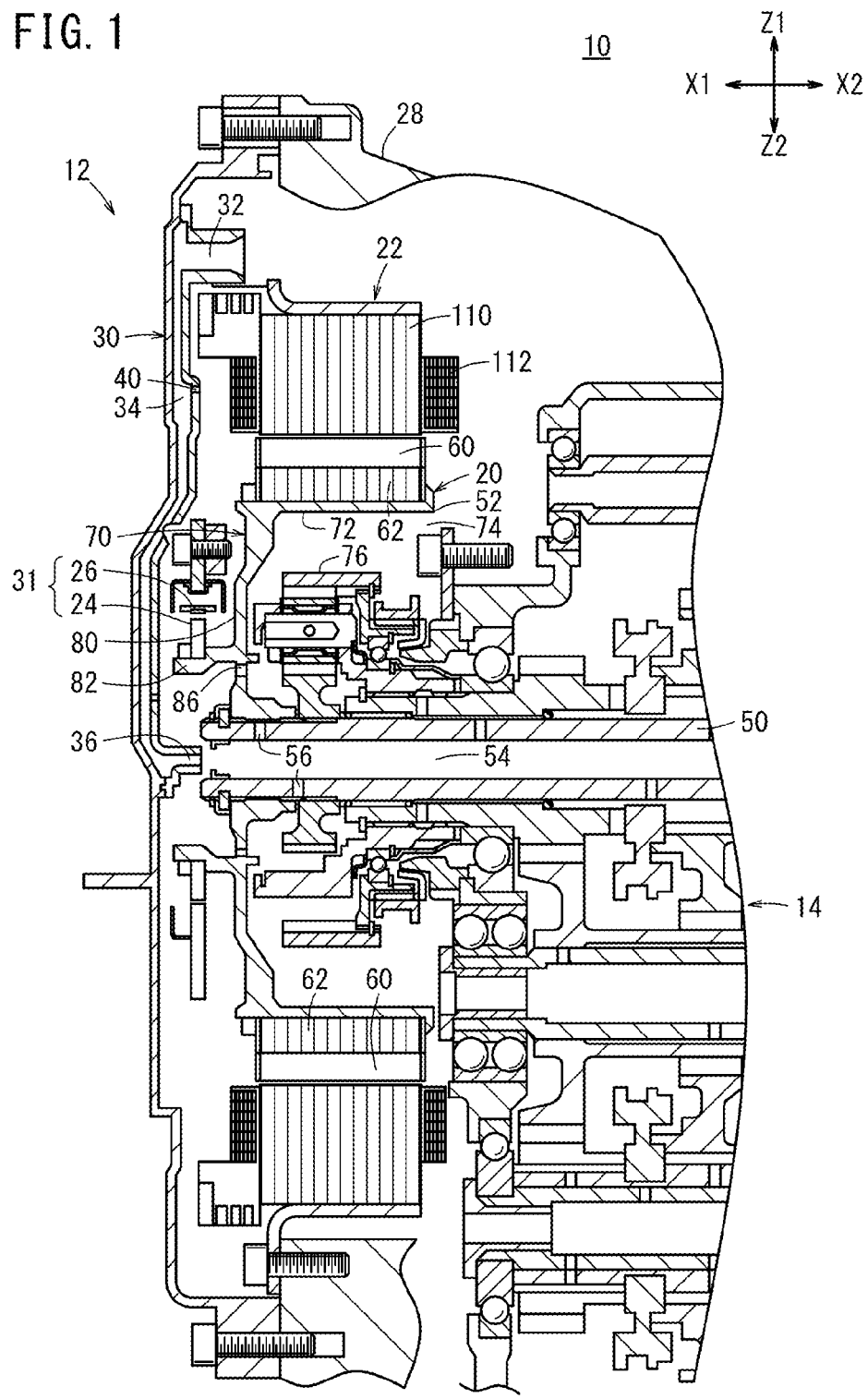
FIG. 1 is a fragmentary cross-sectional view of a vehicle, especially a cooling system thereof, in which there is incorporated a motor that serves as a rotary electric machine according to an embodiment of the present invention.
Figure 2:
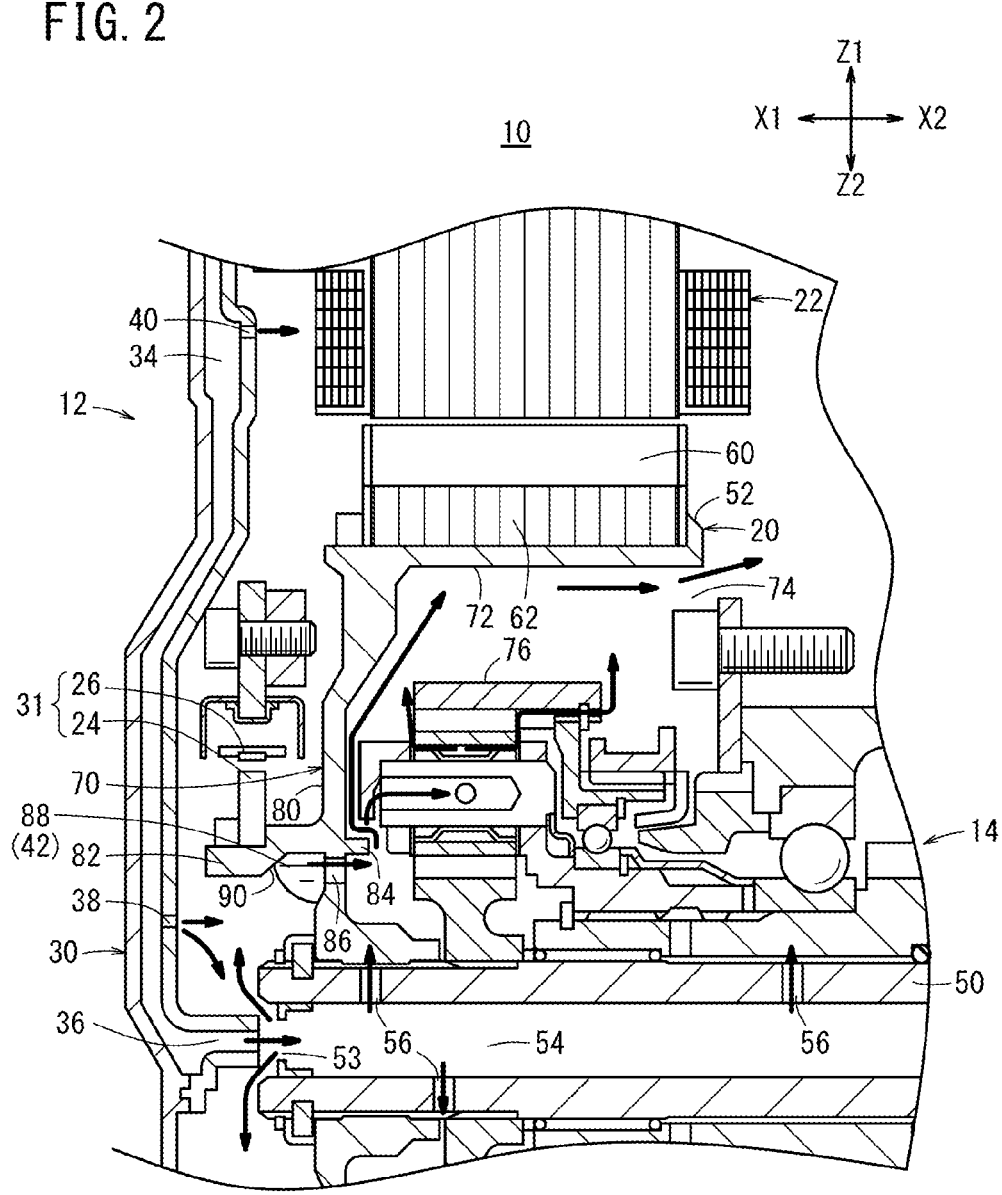
FIG. 2 is an enlarged fragmentary cross-sectional view showing flows of an oil coolant in the motor.
Figure 3:
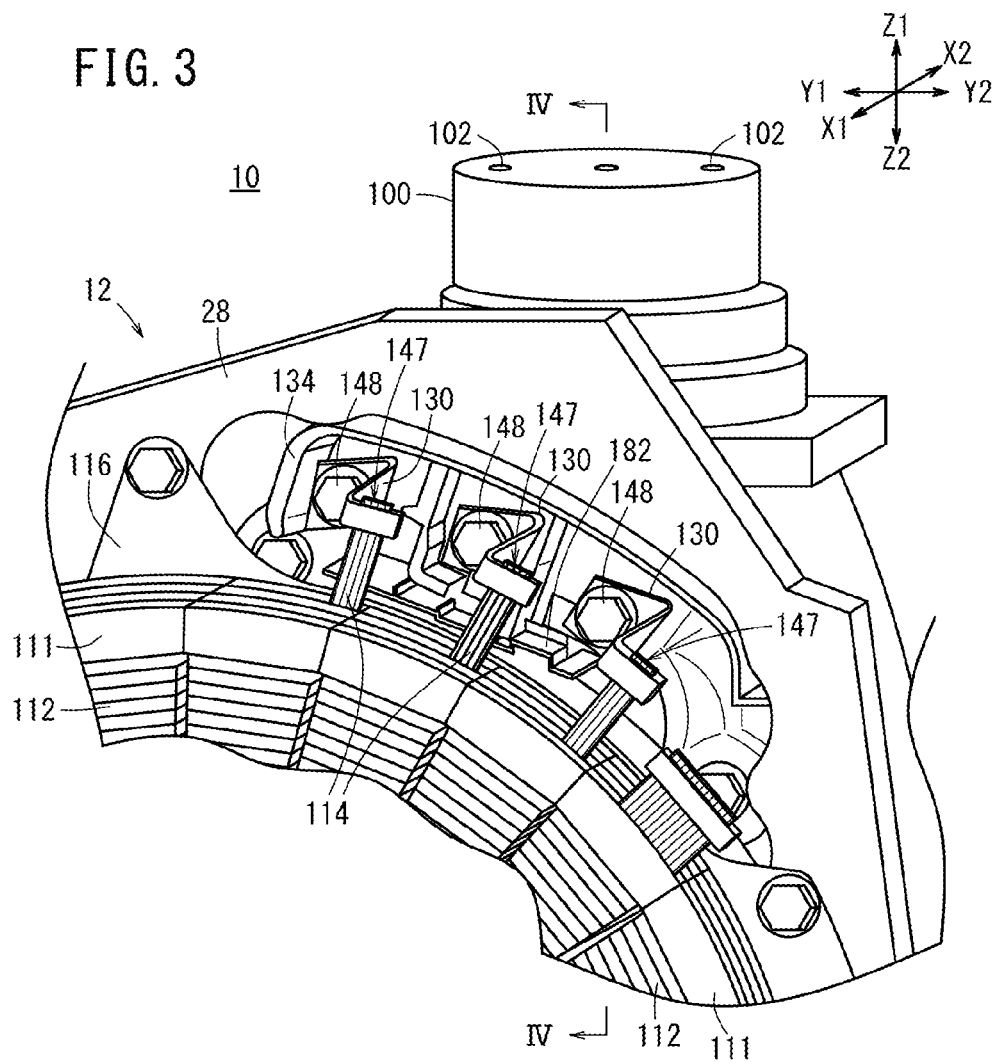
FIG. 3 is a fragmentary perspective view, partially cut away, of an electric power system of the vehicle.
Figure 4:
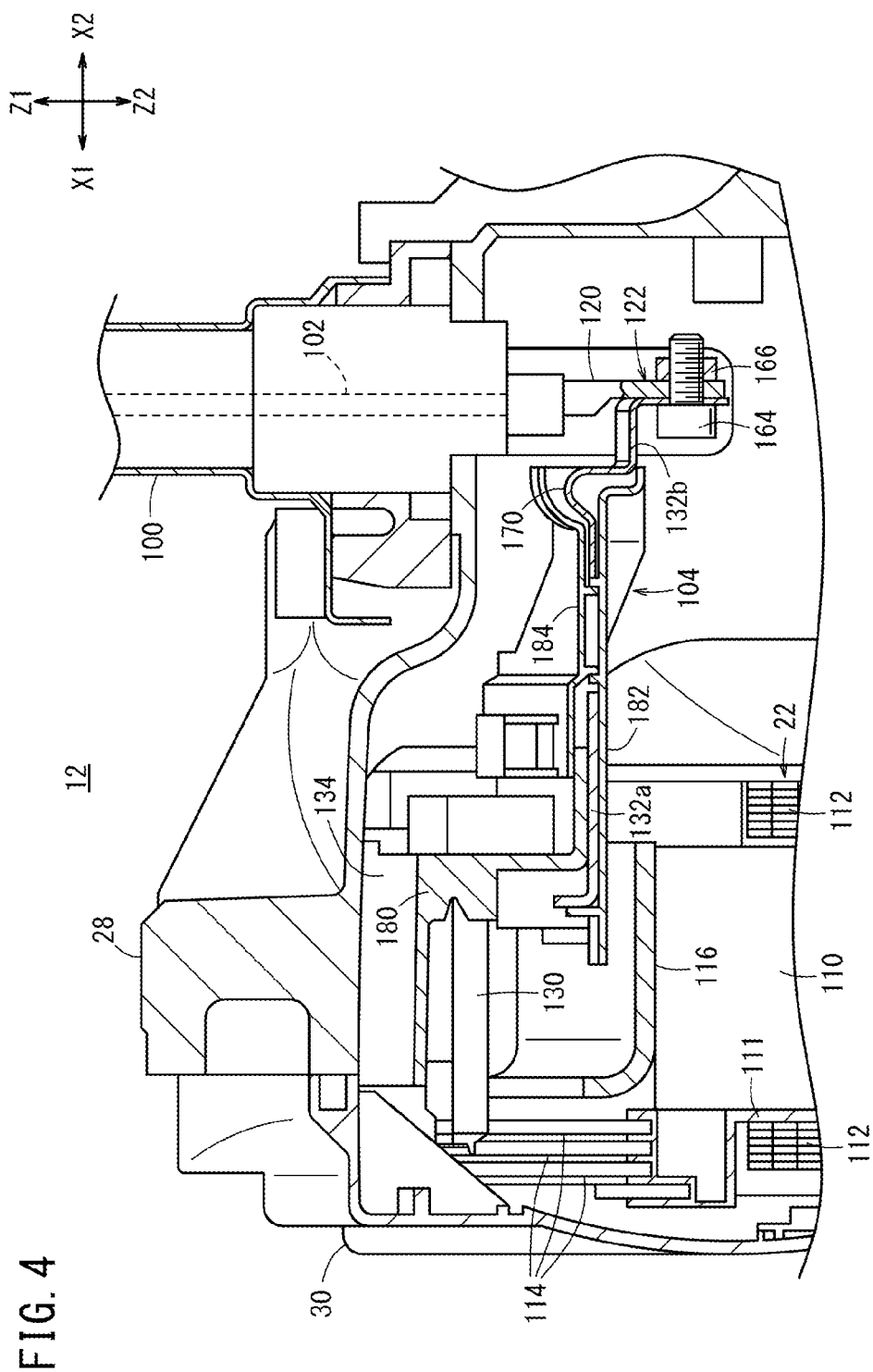
FIG. 4 is a fragmentary cross-sectional view taken along line IV-IV of FIG. 3.

FIG. 1 is a fragmentary cross-sectional view of a vehicle 10, especially a cooling system (coolant supply unit) thereof, which incorporates a motor 12 as a rotary electric machine according to an embodiment of the present invention. FIG. 2 is an enlarged fragmentary cross-sectional view showing flows of an oil coolant 42 in the motor 12. In FIG. 2, the thick arrows represent flows of the oil coolant 42. FIG. 3 is a fragmentary perspective view, partially cut away, of an electric power system of the vehicle 10. FIG. 4 is a fragmentary cross-sectional view taken along line IV-IV of FIG. 3. It should be noted that, for facilitating understanding of the present invention, FIGS. 1 and 2 are cross-sectional views taken along line I-I of FIG. 6, to be described later. Further, a side cover 30 (to be described later) in FIGS. 1 and 2 is shown in cross section (taken along line I-I of FIG. 5) through all of an inlet hole 32 and first through third outlet holes 36, 38, 40, to be described later (see FIG. 5).

As shown in FIG. 1, the vehicle 10 has a speed reducer 14, which serves as a gear mechanism, in addition to the motor 12. A portion of the speed reducer 14 is disposed in the motor 12.

The motor 12 serves as a drive source for generating a drive force F for the vehicle 10. The motor 12 comprises a three-phase AC brushless motor for generating the drive force F for the vehicle 10 based on electric power supplied from a non-illustrated battery through a non-illustrated inverter. The motor 12 also regenerates electric power (regenerative electric power Preg) [W] in a regenerative mode, and outputs the regenerative electric power Preg to the battery in order to charge the battery. The regenerative electric power Preg may be output to a 12-volt system or a non-illustrated accessory device.

As shown in FIGS. 1 through 4, the motor 12 has a motor rotor 20 (hereinafter also referred to as a "rotor 20"), a motor stator 22 (hereinafter also referred to as a "stator 22"), a resolver rotor 24, a resolver stator 26, a motor housing 28, and the side cover 30. The resolver rotor 24 and the resolver stator 26 jointly make up a resolver 31.

[1-2. Cooling System]
(1-2-1. Side Cover 30)

Figure 5:
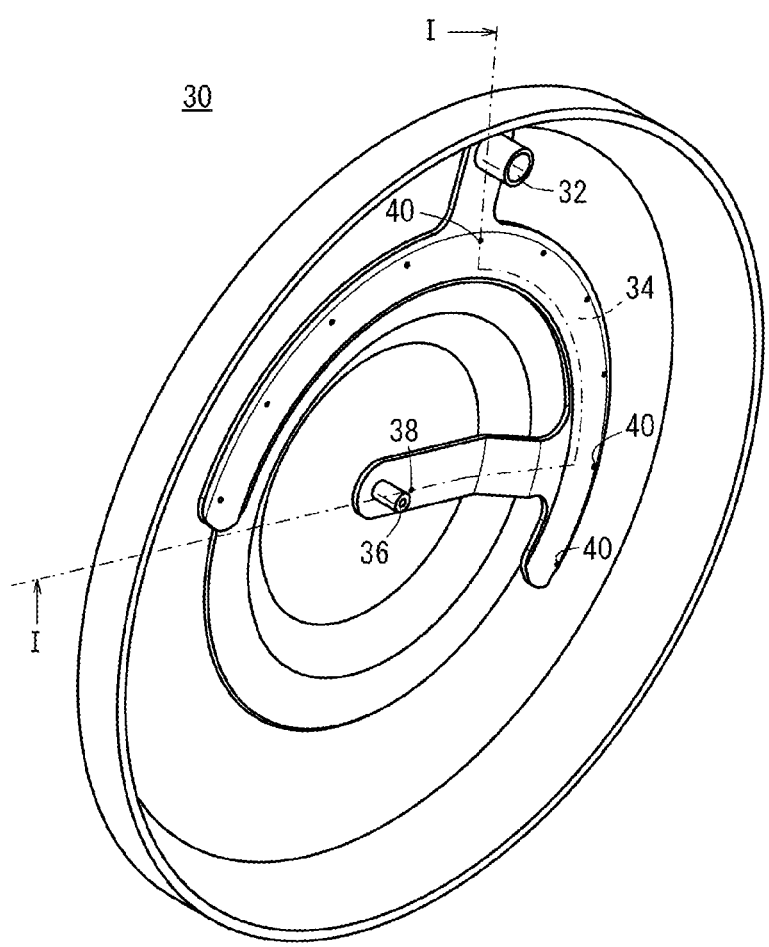
FIG. 5 is a perspective view of a side cover that functions as a portion of the cooling system.

FIG. 5 is a perspective view of the side cover 30, which functions as a portion of the cooling system. As shown in FIGS. 1, 2, and 5, the side cover 30 has a single inlet hole 32, a flow passage 34, a single first outlet hole 36, a single second outlet hole 38, and a plurality of third outlet holes 40. The first through third outlet holes 36, 38, 40 are supplied with an oil coolant 42 from a non-illustrated pump, which may be an electric pump or a mechanical pump.

As shown in FIGS. 1, 2, and 5, according to the present embodiment, the oil coolant 42 is ejected or discharged from the side cover 30 toward the rotor 20 and the stator 22.

More specifically, the first outlet hole 36 ejects or discharges the oil coolant 42 primarily toward a rotational shaft 50 of the rotor 20. The second outlet hole 38 ejects or discharges the oil coolant 42 primarily toward a tubular member 52 of the rotor 20. The third outlet hole 40 ejects or discharges the oil coolant 42 primarily toward the stator 22. Each of the outlet holes 36, 38, 40 is in the form of a nozzle for ejecting or discharging the oil coolant 42.

(1-2-2. Motor Rotor 20)
(1-2-2-1. Rotational Shaft 50)

As shown in FIGS. 1 and 2, the rotational shaft 50 of the rotor 20 has an axial opening 53 for supplying the oil coolant 42 to the inside of the rotational shaft 50, a single first axial flow passage 54 that extends along axial directions X1, X2 (see FIG. 1), and a plurality of second axial flow passages 56, which establish fluid communication along radial directions R1, R2 (see FIG. 6) of the motor 12 between the first axial flow passage 54 and the outside of the rotational shaft 50.

The oil coolant 42, which is supplied from the first outlet hole 36 of the side cover 30, is guided through the first axial flow passage 54 into the second axial flow passages 56, and then is discharged through the second axial flow passages 56 from the rotational shaft 50. The discharged oil coolant 42 is supplied to the inside of the rotor 20 or to a portion of the speed reducer 14.

(1-2-2-2. Tubular Member 52)
(1-2-2-2-1. General)

As shown in FIG. 2, etc., the rotor 20 has, in addition to the rotational shaft 50, a bottomed tubular member 52, a rotor core 60, and a rotor yoke 62.

The tubular member 52 includes a bottom wall 70 fixed to the outer circumferential surface of the rotational shaft 50 near the side cover 30, and a side wall 72 that extends in the axial direction X2 from the outer edge of the bottom wall 70. The side wall 72 opens remotely from the bottom wall 70, i.e., the side wall 72 has an opening 74 remote from the bottom wall 70. The speed reducer 14 has a planet gear 76 disposed in the tubular member 52.

(1-2-2-2-2. Bottom Wall 70)

As shown in FIG. 2, the bottom wall 70 includes a base 80, a first protrusive wall 82, and a second protrusive wall 84. The base 80 extends along the radial direction R1. The base 80 has a plurality of through holes 86 defined in a portion thereof. The through holes 86 extend along the axial directions X1, x2 through the bottom wall 70 (base 80).

Figure 6:
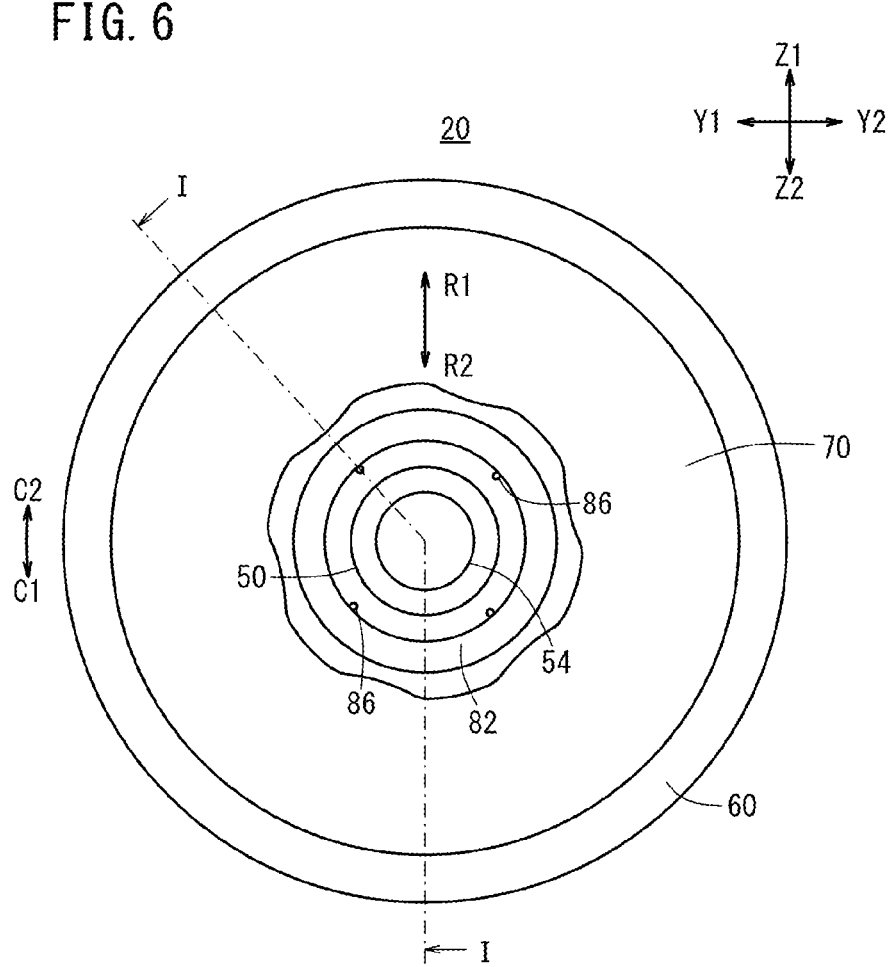
FIG. 6 is a plan view, which is illustrated in a simplified form, showing the positions of through holes in a motor rotor.

FIG. 6 is a plan view showing the positions of the through holes 86 in the motor rotor 20, which is illustrated in a simplified form. As shown in FIG. 6, according to the present embodiment, there are four through holes 86, which are spaced at equal intervals. The oil coolant 42, which is ejected from the side cover 30 toward the bottom wall 70, is supplied through the through holes 86 to the inside of the tubular member 52.

The first protrusive wall 82 projects toward the side cover 30 (along the direction X1) from a portion positioned radially outward (along the direction R1) of the through holes 86. The first protrusive wall 82 has an annular shape. For this reason, if the oil coolant 42, which is ejected or discharged from the side cover 30 toward the bottom wall 70 during rotation of the rotor 20, does not enter the through holes 86 directly, then the oil coolant 42 remains in an inner circumferential region of the first protrusive wall 82, i.e., a region surrounded by the base 80 and the first protrusive wall 82, under centrifugal forces that act on the oil coolant 42. Stated otherwise, the base 80 and the first protrusive wall 82 jointly provide a reservoir 88 for the oil coolant. Therefore, even if the oil coolant 42 does not enter the through holes 86 directly, the oil coolant 42 remains in the reservoir 88 and thereafter is supplied through the through holes 86 to the inside of the tubular member 52.

The first protrusive wall 82 has a portion that overlaps with the axial opening 53 of the rotational shaft 50, as viewed along the radial directions R1, R2 of the rotor 20. Therefore, the oil coolant 42, which overflows the first axial flow passage 54 through the axial opening 53, remains in the inner circumferential region of the first protrusive wall 82 under centrifugal forces or by gravity, and thereafter, the oil coolant 42 is supplied through the through holes 86 to the inside of the tubular member 52. Consequently, the oil coolant 42, which flows over the first axial flow passage 54 through the axial opening 53, can be used to cool the rotor core 60 efficiently.

In addition, as shown in FIG. 2, the first protrusive wall 82 has a greater-diameter portion 90, which is progressively greater in diameter in a direction from the side cover 30 toward the base 80 of the bottom wall 70, i.e., in the direction X2. The greater-diameter portion 90 makes it easy for the reservoir 88 to be formed radially inward of the first protrusive wall 82, i.e., in the direction R2, thereby minimizing the amount of oil coolant 42 that does not enter into the tubular member 52 after being supplied radially inward of the first protrusive wall 82, i.e., in the direction R2. In FIG. 2, the first protrusive wall 82 is shown as being increased in diameter in both radial inward and radial outward directions. However, even if the first protrusive wall 82 is increased in diameter in the radial inward direction only, the first protrusive wall 82 is capable of operating in the aforementioned manner to offer the advantages described above.

The resolver rotor 24, i.e., the rotor of a rotary sensor, is fixed to a radial outer surface of the first protrusive wall 82, i.e., a surface thereof that faces in the direction R1. Therefore, the first protrusive wall 82 functions both to provide the reservoir 88 for the oil coolant 42, and to retain the resolver rotor 24. Consequently, the motor 12 can be simpler in structure than if a member for retaining the resolver rotor 24 were provided separately from the first protrusive wall 82.

As shown in FIG. 2, the second protrusive wall 84 projects toward the opening 74 (along the direction X2 in FIG. 2) from a portion positioned radially outward (along the direction R1) of the through holes 86. The second protrusive wall 84 has an annular shape. A distal end of the second protrusive wall 84 overlaps with a portion of the planet gear 76, as viewed along a radial outward direction of the rotor 20 (along the direction R1). Therefore, the oil coolant 42, which is guided by the second protrusive wall 84, is supplied to a portion of the planet gear 76 when the oil coolant 42 is discharged under centrifugal forces in a radial outward direction (along the direction R1).

(1-2-2-2-3. Side Wall 72)

As shown in FIGS. 1 and 2, the rotor core 60 and the rotor yoke 62 are fixed to a radial outer surface (which faces in the direction R1) of the side wall 72 of the tubular member 52. As described above, the oil coolant 42 is supplied from the side cover 30 to the inside of the tubular member 52 through the rotational shaft 50 or the bottom wall 70 of the tubular member 52. Thereafter, as the oil coolant 42 moves along the side wall 72 while the rotor 20 rotates, the oil coolant 42 cools the rotor core 60.

The oil coolant 42, which has reached the side wall 72, moves along the side wall 72 into the opening 74 from which the oil coolant 42 is discharged. Thereafter, the oil coolant 42, which is discharged from the opening 74, is pooled on the bottom (not shown) of the motor housing 28, whereupon the oil coolant 42 is ejected or discharged again from the side cover 30 toward the rotor 20 or the stator 22 by the pump. Heat from the oil coolant 42 may undergo heat transfer by a cooler or a warmer, not shown, before the oil coolant 42 is ejected or discharged again.

(1-2-3. Motor Stator 22)

The oil coolant 42, which is supplied from the third outlet holes 40 of the side cover 30, passes through the stator 22 while cooling various parts of the stator 22, and drops onto the bottom of the motor housing 28.

As will be described in detail later, even if the oil coolant 42 enters a second cover 182 (insulating cover) upon moving through the stator 22, the oil coolant 42 is discharged through oil discharge ports 190 (see FIGS. 16, 17, and 19).

As shown in FIG. 2, etc., the resolver stator 26 is disposed on the motor stator 22 radially outward of the resolver rotor 24 along the direction R1. The resolver stator 26 produces an output signal depending on the rotational angle of the resolver rotor 24. Therefore, the resolver 31 is capable of detecting the rotational angle of the motor rotor 20.

[1-3. Electric Power System]

(1-3-1. General)

As described above, FIG. 3 is a fragmentary perspective view, partially cut away, of the electric power system of the vehicle 10 in which the motor 12, which serves as a rotary electric machine according to the present embodiment, is incorporated. FIG. 4 is a fragmentary cross-sectional view taken along line IV-IV of FIG. 3.

In addition to the rotor 20 and the stator 22, the electric power system of the motor 12 according to the present embodiment includes a harness 100 (external electric power lines 102) and a junction conductor 104.

(1-3-2. Motor Stator 22)

Figure 7:
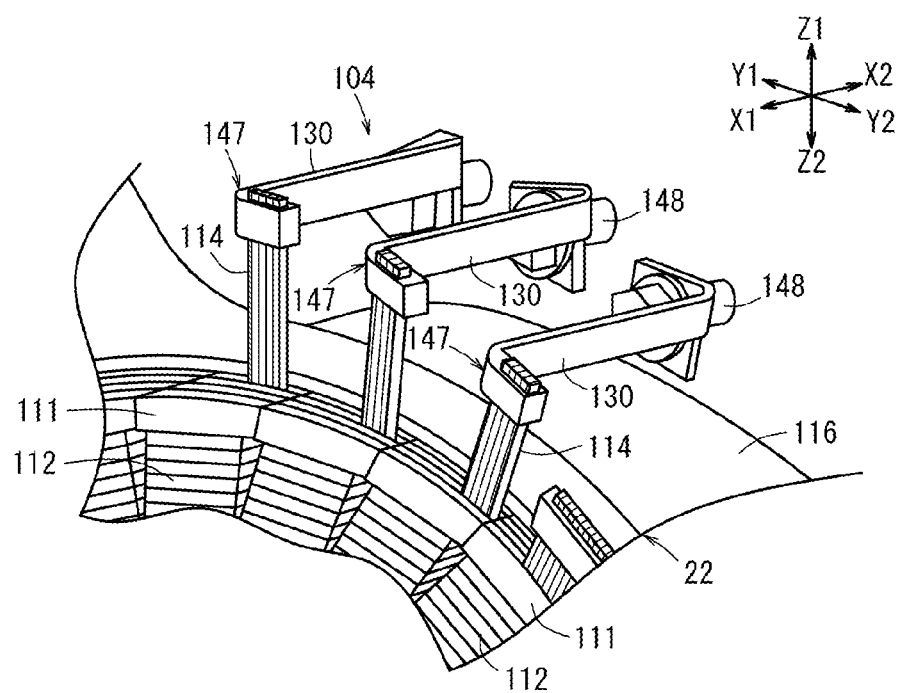
FIG. 7 is a perspective view of a joint between a motor stator and a junction conductor.
Figure 8:
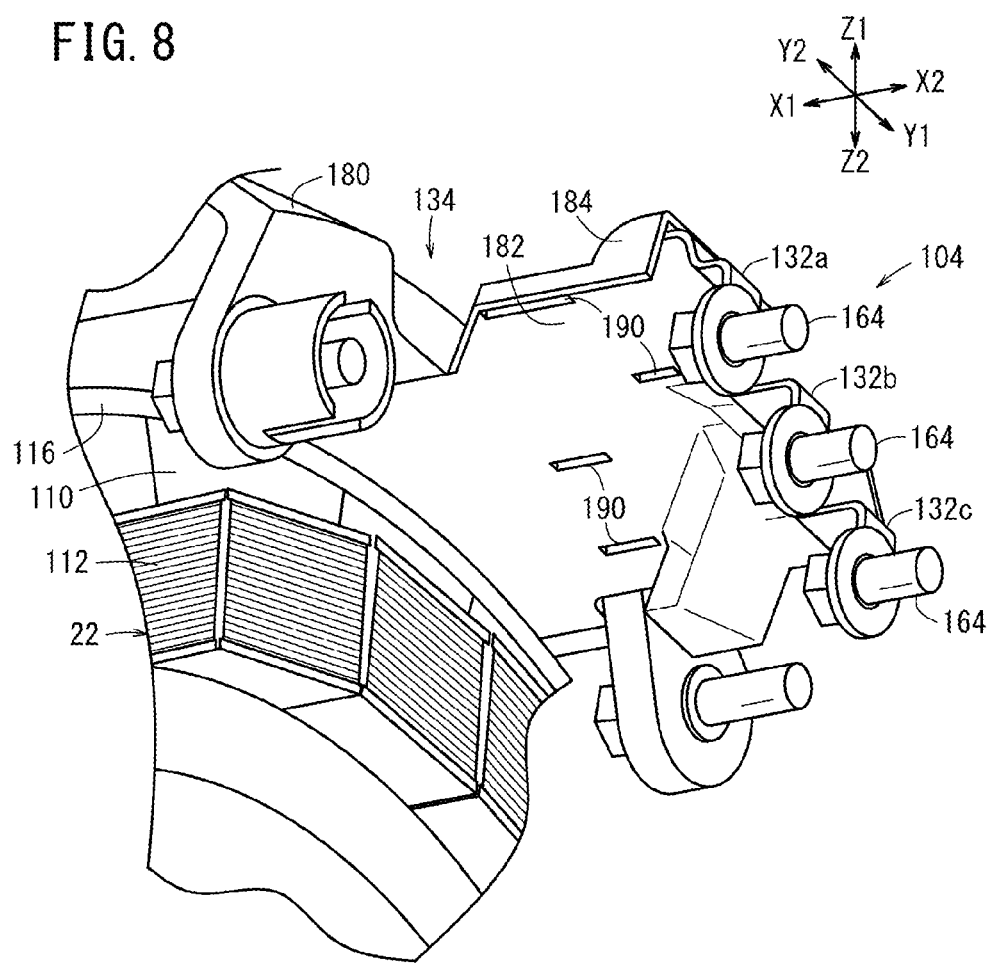
FIG. 8 is a perspective view showing a positional relationship between the motor stator and the junction conductor.

FIG. 7 is a perspective view of a joint between the motor stator 22 and the junction conductor 104. FIG. 8 is a perspective view showing a positional relationship between the motor stator 22 and the junction conductor 104.

The stator 22 includes coils 112 in a plurality of phases (phase U, phase V, phase W) wound on stator cores 110 with insulating members 111 interposed therebetween. As shown in FIG. 7, the coils 112 have respective ends bundled into coil ends 114 in the respective phases. As shown in FIG. 7, the coil ends 114 project radially outward (along the direction R1). Reference should also be made to FIG. 7 of Japanese Laid-Open Patent Publication No. 2009-017667 (hereinafter referred to as "JP 2009-017667 A"), which provides a description of the manner in which the ends of the coils 112 are bundled in the respective phases.

As shown in FIGS. 3, 4, 7, and 8, the stator cores 110 are housed in a stator holder 116 (stator housing), which is disposed on a radial outward side (along the direction R1).

(1-3-3. Harness 100 (External Electric Power Lines 102)

The harness 100 includes external electric power lines 102 in the plural phases (phase U, phase V, phase W). The external electric power lines 102 refer to electric power lines, which connect the motor 12 and the non-illustrated inverter outside of the motor housing 28. As shown in FIG. 4, terminals 120 of the external electric power lines 102 are connected to the junction conductor 104. According to the present invention, joints (external electric power line joints 122) between the terminals 120 and the junction conductor 104 are disposed radially inward (along the direction R2) of the outer circumferential surface of the stator 22 (and the outer circumferential surface of the stator holder 116). Therefore, the overall dimension of the motor 12 along the directions R1, R2 is small. The external electric power line joints 122 are positioned closer to the speed reducer 14 than the stator 22 along the axial directions X1, X2.

(1-3-4. Junction Conductor 104)

The junction conductor 104 serves to electrically join (connect) the coils 112 and the external electric power lines 102. The junction conductor 104 comprises fusing members 130 (coil-side conductors) in the respective phases, bus bars 132a through 132c (external electric power line-side conductors) in the respective phases, and a terminal base 134. The fusing members 130 and the bus bars 132a through 132c jointly make up a junction.

(1-3-4-1. Fusing Members 130)

Figure 9:
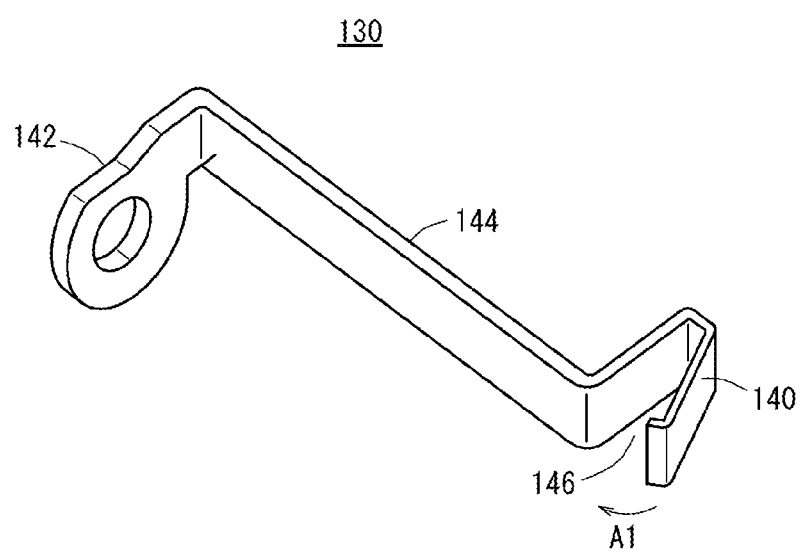
FIG. 9 is a perspective view of a fusing member.
Figure 10:
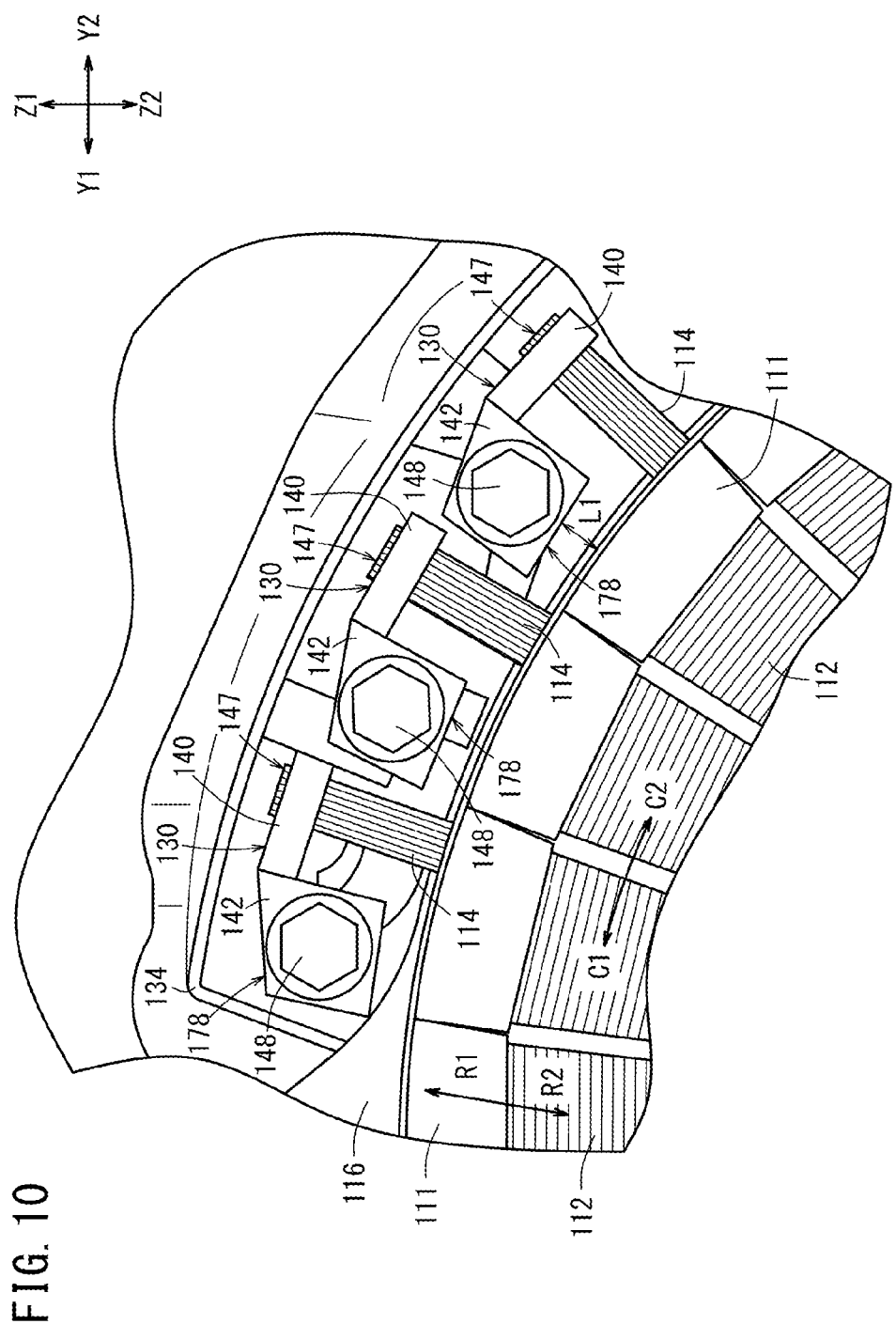
FIG. 10 is a front elevational view showing a positional relationship between fusing members and a terminal base.

FIG. 9 is a perspective view of a fusing member 130. FIG. 10 is a front elevational view showing a positional relationship between the fusing members 130 and the terminal base 134. As shown in FIGS. 7 and 9, etc., each of the fusing members 130 is in the form of a bent plate.

More specifically, the fusing member 130 includes a coil connecting panel 140, a terminal base connecting panel 142, and an intermediate panel 144 disposed between the coil connecting panel 140 and the terminal base connecting panel 142.

As shown in FIG. 9, the coil connecting panel 140 has an opening 146 defined therein for insertion of the coil ends 114. After the coil ends 114 have been inserted in the opening 146, the tip end of the coil connecting panel 140 is biased in the direction indicated by the arrow A1 in FIG. 9 so as to close the opening 146, and the coil ends 114 and the coil connecting panel 140 are joined by being crimped with heat (see FIG. 7, etc.). The joints between the coil ends 114 and the coil connecting panel 140 will hereinafter be referred to as "coil joints 147".

Figure 15:
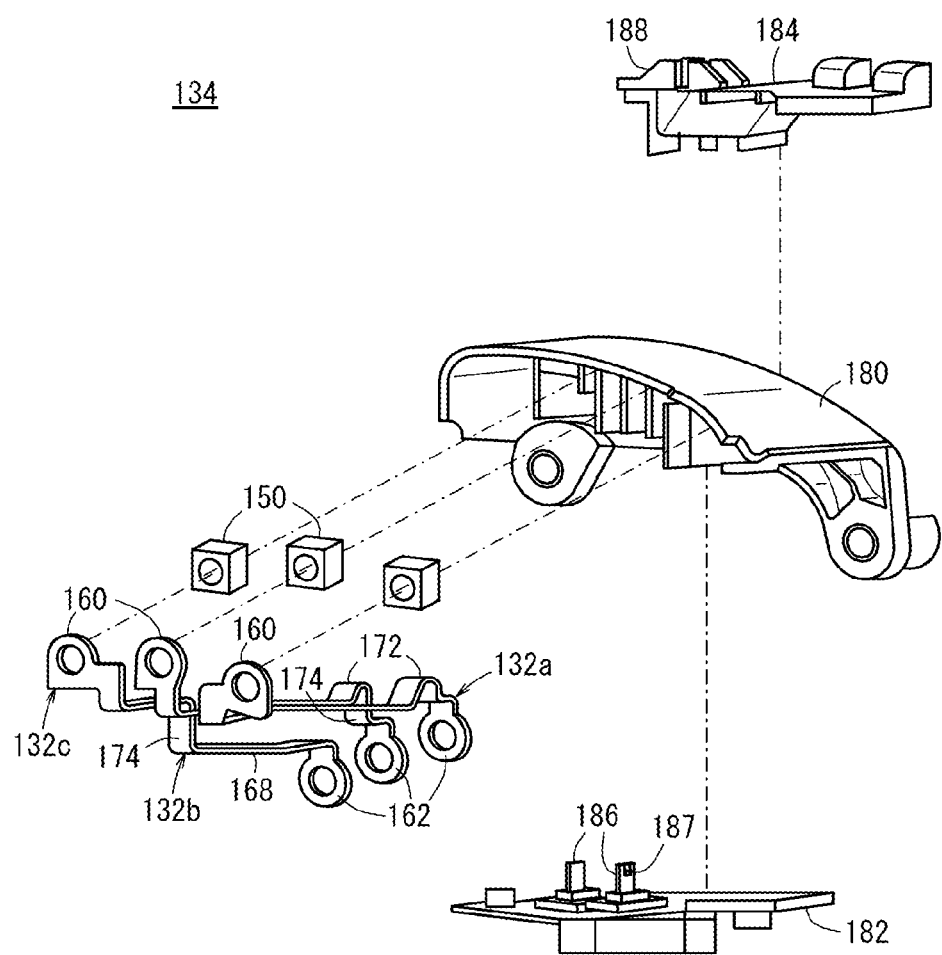
FIG. 15 is an exploded perspective view of the terminal base and the bus bars.

As shown in FIGS. 3, 7, and 10, the terminal base connecting panels 142 are fastened to the terminal base 134 by bolts 148 and nuts 150 (see also FIG. 15).

As seen from FIGS. 3, 7, and 10, the coil connecting panel 140, the terminal base connecting panel 142, and the intermediate panel 144 according to the present embodiment lie in directions (the directions R1, R2) perpendicular to the outer circumferential surface of the stator 22 (or the stator holder 116).

More specifically, the coil connecting panel 140 and the terminal base connecting panel 142 are disposed in circumferential directions (the directions C1, C2 in FIG. 10) and radial directions (the directions R1, R2 in FIG. 10). The thicknesswise directions of the coil connecting panel 140 and the terminal base connecting panel 142 are disposed parallel to the axial directions X1, X2 and are not oriented toward the outer circumferential surface of the stator 22. The intermediate panel 144 is disposed along axial directions (the directions X1, X2 in FIG. 4) and radial directions (the directions R1, R2 in FIG. 10). The thicknesswise direction of the intermediate panel 144 is located in close proximity to the circumferential directions C1, C2 and is not oriented toward the outer circumferential surface of the stator 22. The intermediate panel 144 is oriented in this manner for the following reasons.

If the intermediate panel 144 were disposed along the circumferential directions C1, C2 and the axial directions X1, X2, for example, or stated otherwise, if the thicknesswise direction of the intermediate panel 144 were to lie parallel to the radial directions R1, R2, then the intermediate panel 144 would be disposed more closely to the outer circumferential surface of the stator 22 by the thickness dimension thereof. In such a case, for insulating the intermediate panel 144 from the outer circumferential surface of the stator 22, it is necessary for the intermediate panel 144 to be spaced away from the outer circumferential surface of the stator 22, which results in an increase in the radial dimensions of the motor 12.

Figure 11:
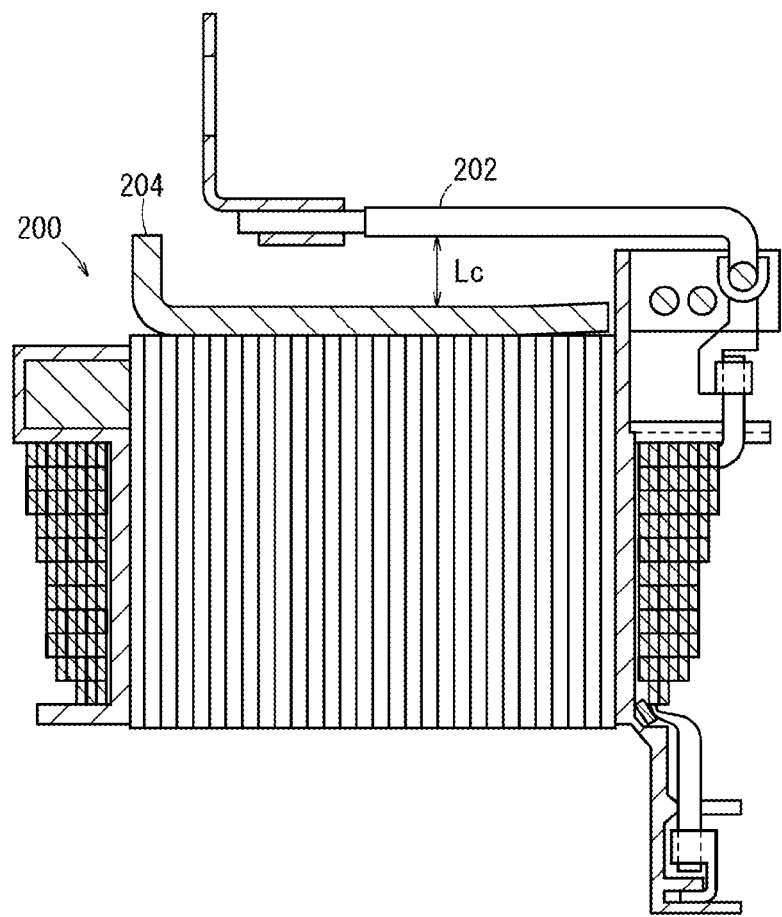
FIG. 11 is a view showing a stator that is illustrated in FIG. 3 of Japanese Laid-Open Patent Publication No. 2009-017667.

FIG. 11 shows a stator (hereinafter referred to as a "stator 200"), which is illustrated in FIG. 3 of JP 2009-017667 A. The stator 200 shown in FIG. 11 has a lead frame 202, the thicknesswise direction of which faces toward the outer circumferential surface of a stator holder 204. Therefore, in order to be insulated from each other, the lead frame 202 and the stator holder 204 need to be spaced from each other by a relatively large distance Lc.

In contrast thereto, according to the present embodiment, from the standpoint of insulating the intermediate panel 144 and the stator 22 from each other, since the intermediate panel 144 is disposed along the axial directions X1, X2 and the radial directions R1, R2, it is possible to make the distance L1 (FIG. 10) between the intermediate panel 144 and the outer circumferential surface of the stator 22 shorter. The same feature holds true for the coil connecting panel 140 and the terminal base connecting panel 142.

As shown in FIG. 10, according to the present embodiment, each of the fusing members 130 includes the coil connecting panel 140 and the terminal base connecting panel 142, which are staggered along the circumferential directions C1, C2. Therefore, when a worker or a manufacturing apparatus assembles the terminal base connecting panel 142 and thereafter assembles the coil connecting panel 140 in the axial direction X2, assembly of each of the terminal base connecting panel 142 and the coil connecting panel 140 is facilitated, because the respective members do not overlap with each other.

Furthermore, inasmuch as the intermediate panel 144 of the fusing member 130 is disposed along the axial directions X1, X2 and the radial directions R1, R2, the intermediate panel 144 is less likely to overlap with the terminal base connecting panel 142, thereby facilitating assembly of the intermediate panel 144. Also, the dimensions of the fusing member 130 are prevented from increasing along the circumferential directions C1, C2.

(1-3-4-2. Bus Bars 132a through 132c)

Figure 12:
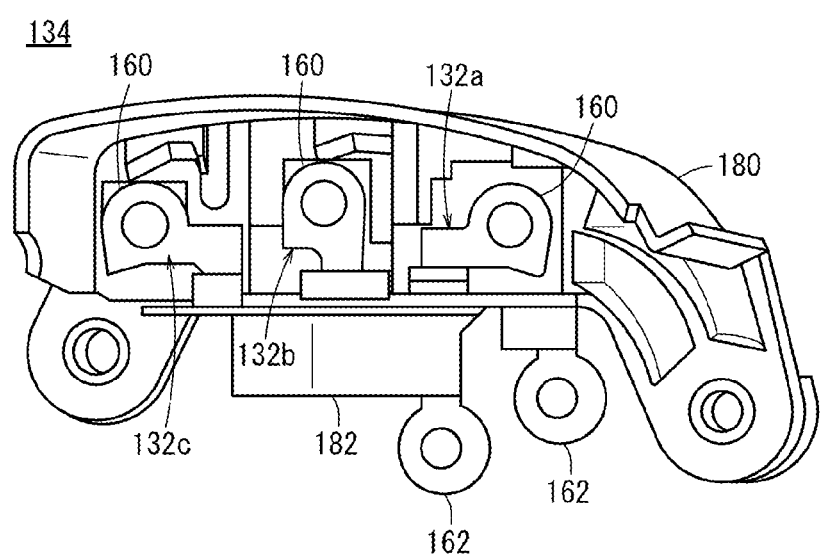
FIG. 12 is a first perspective view of the terminal base with bus bars assembled thereon.
Figure 13:
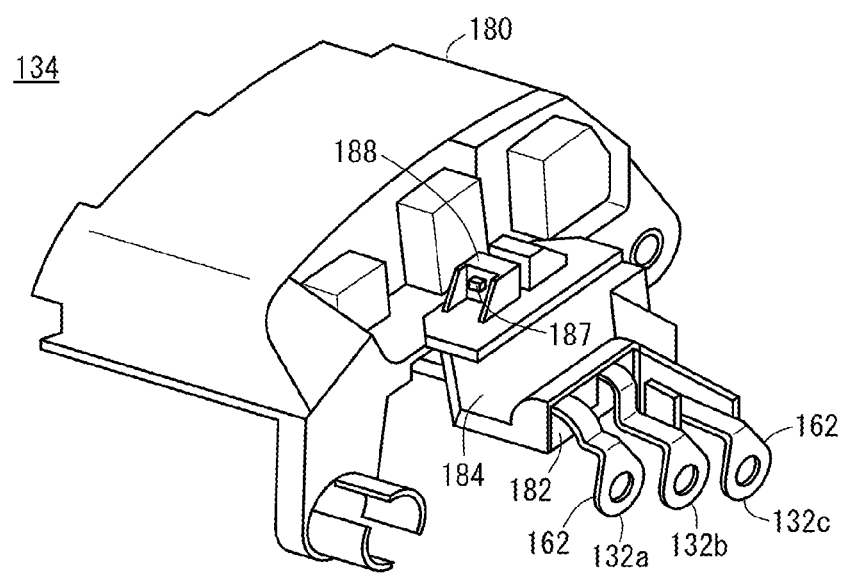
FIG. 13 is a second perspective view of the terminal base with the bus bars assembled thereon.
Figure 14:
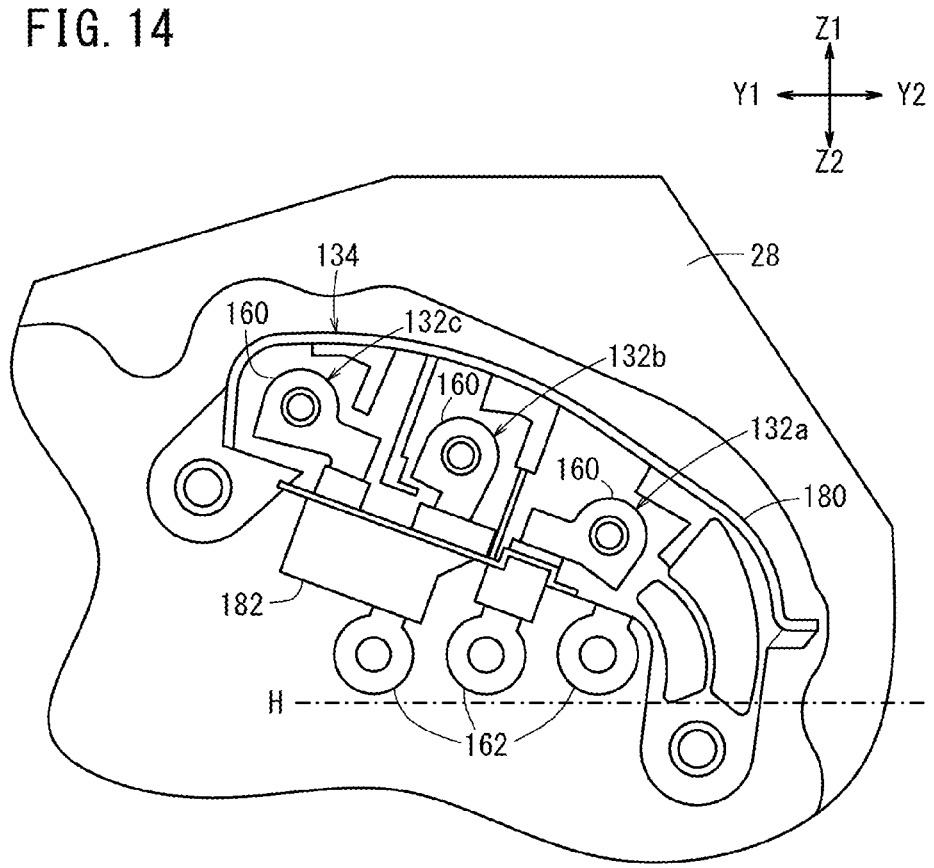
FIG. 14 is a view showing a positional relationship between a motor housing and the terminal base with the bus bars assembled thereon.

FIGS. 12 and 13 are first and second perspective views, respectively, of the terminal base 134 with the bus bars 132a through 132c assembled thereon. FIG. 14 is a view showing a positional relationship between the terminal base 134 with the bus bars 132*a* through 132*c* assembled thereon, and the motor housing 28. FIG. 15 is an exploded perspective view of the terminal base 134 and the bus bars 132*a* through 132*c*. FIG. 16 is a perspective view of a second cover 182 (insulating cover) with the bus bars 132*a* through 132*c* assembled thereon. As shown in FIG. 15, etc., each of the bus bars 132*a* through 132*c* comprises a plate-like member (e.g., a copper plate) that is blanked and bent.

As shown in FIG. 15, etc., each of the bus bars 132*a* through 132*c* has one end (fusing member connector 160) fastened to the terminal base connecting panel 142 of the fusing member 130 by a bolt 148 and a nut 150 on the terminal base 134. The other end of each of the bus bars 132*a* through 132*c* (external electric power line joints 162) is fastened to the terminal 120 of the external electric power line 102 by a bolt 164 (FIG. 4) and a nut 166. As shown in FIG. 4, external electric power line joints 162 of the bus bars 132*a* through 132*c*, and external electric power line joints 122 of the terminals 120 of the external electric power lines 102 are positioned radially inward (along the direction R2) of the outer circumferential surface of the motor stator 22 (or the stator holder 116).

Figure 16:
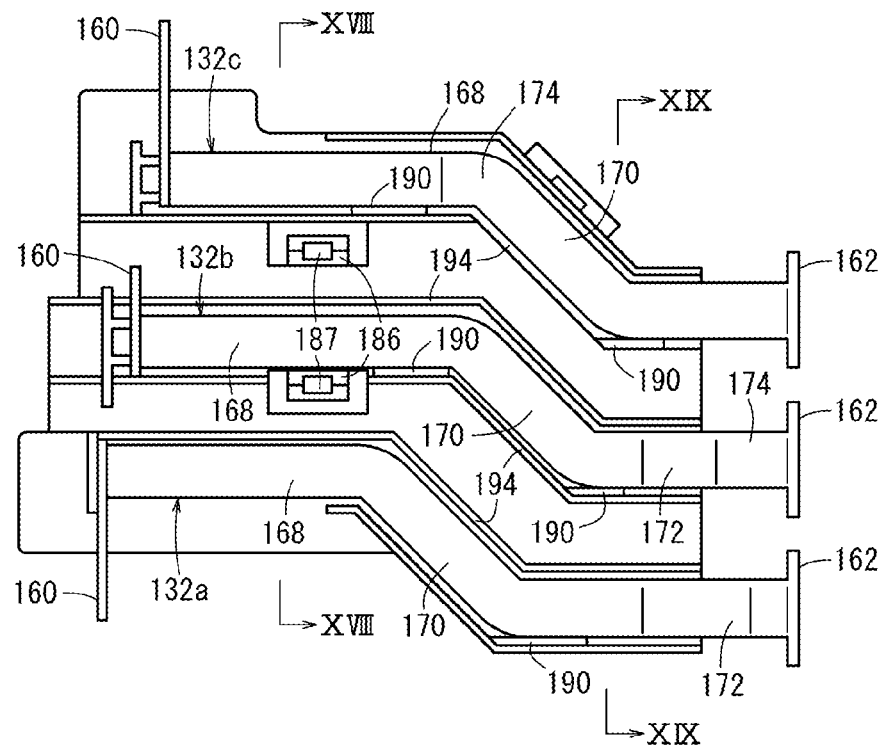
FIG. 16 is a perspective view of a second cover (insulating cover) with the bus bars assembled thereon.

As shown in FIGS. 15 and 16, etc., each of the bus bars 132*a* through 132*c* includes a fusing member connector 160, an external electric power line joint 162, and an intermediate member 168, although these respective elements differ in shape from each other.

More specifically, the intermediate member 168 of the bus bar 132*a* in the first phase (e.g., the phase U) basically extends parallel to the axial directions X1, X2, and further includes a bent portion 170 disposed between the fusing member connector 160 and the external electric power line joint 162, and a bent portion 172 disposed between the bent portion 170 and the external electric power line joint 162.

The intermediate member 168 of the bus bar 132*b* in the second phase (e.g., the phase V) basically extends parallel to the axial directions X1, X2, and further includes a bent portion 170 disposed between the fusing member connector 160 and the external electric power line joint 162, a bent portion 172 disposed between the bent portion 170 and the external electric power line joint 122, and a stepped portion 174 disposed between the bent portion 172 and the external electric power line joint 122.

The intermediate member 168 of the bus bar 132*c* in the third phase (e.g., the phase W) basically extends parallel to the axial directions X1, X2, and further includes a stepped portion 174 disposed between the fusing member connector 160 and the external electric power line joint 162, and a bent portion 170 disposed between the stepped portion 174 and the external electric power line joint 122.

Since the respective bus bars 132*a* through 132*c* are shaped in the foregoing manner, it is possible to maintain the external electric power line joints 162 in an array parallel to a horizontal plane H, as shown in FIG. 14. As a result, it is easy to connect the bus bars 132*a* through 132*c* and the external electric power lines 102 to each other.

The bent portions 170 include bent regions, which are formed by blanking. The bent portions 172 are formed by bending portions of the bus bars 132*a*, 132*b* in the thicknesswise direction thereof. The stepped portions 174 are formed by bending portions of the bus bars 132*b*, 132*c* in the thicknesswise direction thereof.

When there is a change in temperature, the bent portions 172 or the stepped portions 174 are flexed to absorb extensions and contractions of the bus bars 132*a* through 132*c*. Therefore, stresses caused in the bus bars 132*a* through 132*c* when the temperature changes are reduced, thereby preventing the bus bars 132*a* through 132*c* from becoming damaged.

(1-3-4-3. Terminal Base 134)

The terminal base 134 connects the fusing members 130 and the bus bars 132*a* through 132*c* to each other. As shown in FIG. 15, etc., the terminal base 134 has a first cover 180 that covers a radial outer side (facing in the direction R1) of the fusing members 130, and further includes joints (intermediate joints 178) between the fusing members 130 and the bus bars 132*a* through 132*c*, a second cover 182 that covers portions of the lower surfaces of the bus bars 132*a* through 132*c*, and a third cover 184 that covers portions of the upper surfaces of the bus bars 132*a* through 132*c*.

As shown in FIGS. 15 and 16, etc., the second cover 182 has prongs 186 with teeth 187 thereon. The third cover 184 includes recesses 188 defined at positions that are aligned with the prongs 186. As shown in FIG. 13, etc., the second cover 182 and the third cover 184 are coupled to each other when the prongs 186 engage within the recesses 188.

The first cover 180, the second cover 182, and the third cover 184 of the terminal base 134 also function as insulating covers for insulating the bus bars 132*a* through 132*c* from surrounding components (the coils 112 of the stator 22, etc.). Therefore, the second cover 182 will hereinafter also be referred to as an "insulating cover 182".

As shown in FIG. 10, etc., the intermediate joints 178 are positioned radially outward (along the direction R1) of the outer circumferential surface of the motor stator 22.

Further, as shown in FIG. 10, etc., the coil joints 147 (the joints between the coil ends 114 and the fusing members 130) and the intermediate joints 178 (the joints between the fusing members 130 and the bus bars 132*a* through 132*c*) are disposed on circumferential planes, portions of which have the same radius. In addition, the coil joints 147 and the intermediate joints 178 are disposed in positions that are mutually staggered circumferentially as viewed from the axial direction X2.

Therefore, when a worker or a manufacturing apparatus assembles the intermediate joints 178, and thereafter assembles the coil joints 147 in the axial direction X2, it is easy to assemble each of the intermediate joints 178 and the coil joints 147, because the intermediate joints 178 and the coil joints 147 do not overlap with each other.

Figure 17:
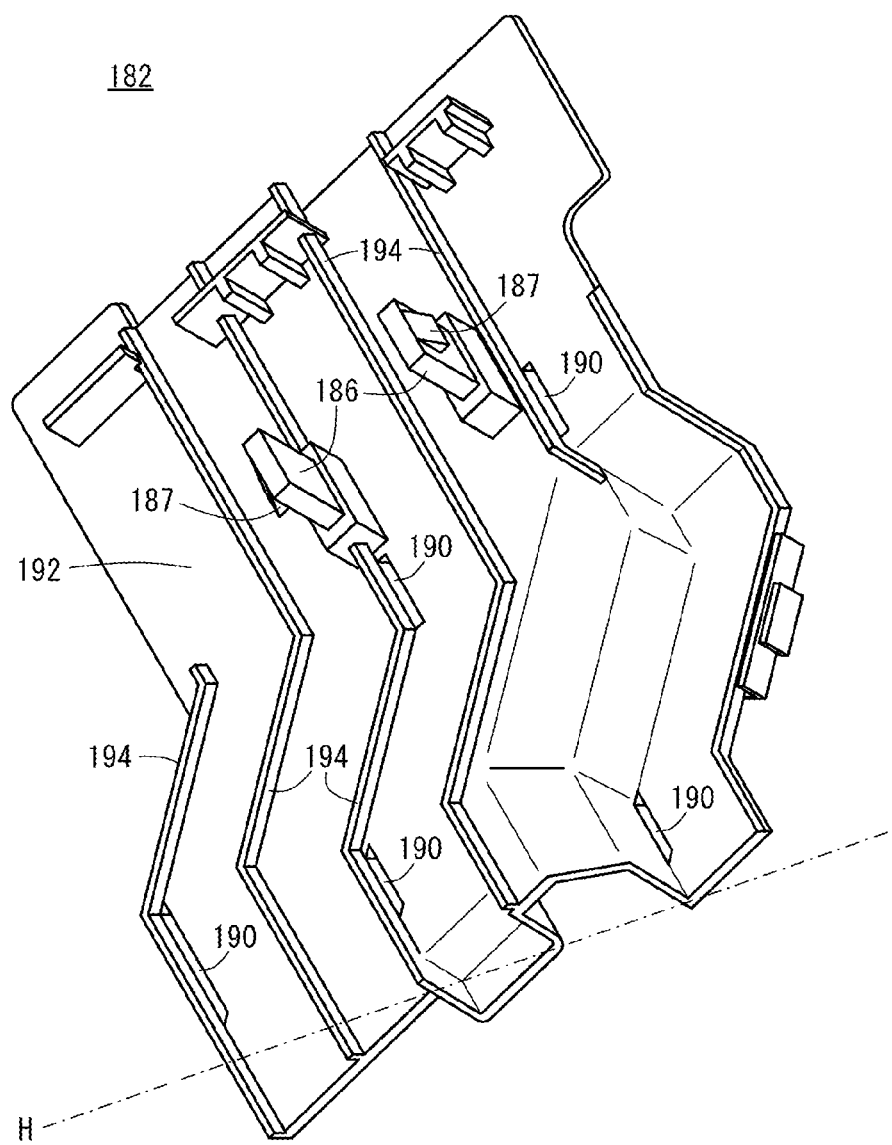
FIG. 17 is a perspective view of the insulating cover.
Figure 18:
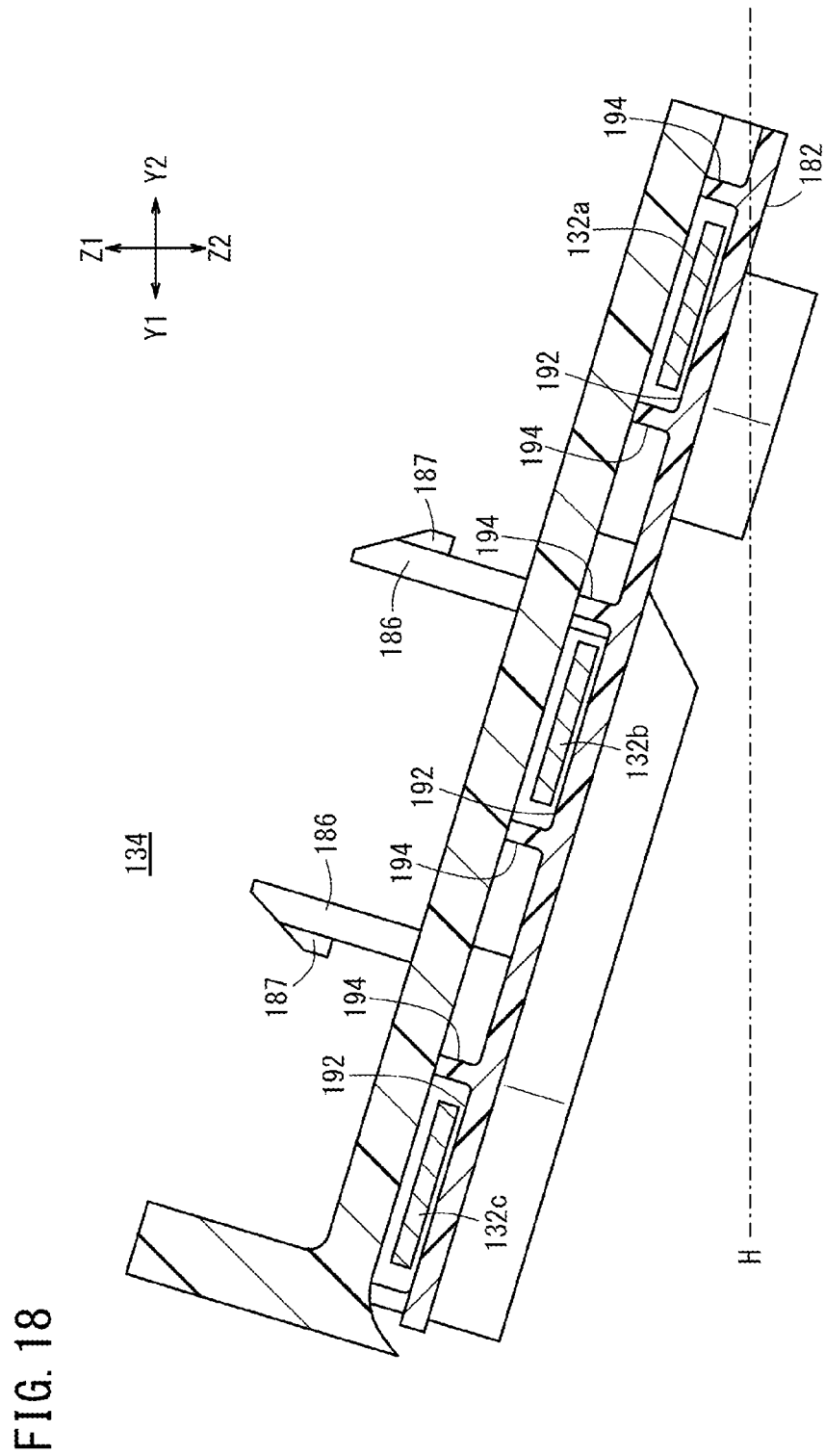
FIG. 18 is a cross-sectional view, taken along line XVIII-XVIII of FIG. 16, of the insulating cover, at a position where oil discharge ports are not present.

FIG. 17 is a perspective view of the insulating cover 182 (second cover 182). FIG. 18 is a cross-sectional view, taken along line XVIII-XVIII of FIG. 16, of the insulating cover 182, at a position where oil discharge ports 190 are not present. FIG. 19 is a fragmentary cross-sectional view, taken along line XIX-XIX of FIG. 16, of the insulating cover 182, at a position where an oil discharge port 190 is present.

As shown in FIG. 4, etc., the insulating cover 182 is disposed between the outer circumferential surface of the motor stator 22 (or the stator holder 116) and the bus bars 132*a* through 132*c* at the coil ends 114 (in the axial direction X1). The insulating cover 182 also extends along the axial direction X2.

As shown in FIG. 18, etc., the insulating cover 182 has a bottom surface 192, which is inclined to the horizontal plane H (along the directions X1, X2 and the directions Y1, Y2), for thereby guiding the oil coolant 42 downwardly by gravity.

Figure 19:
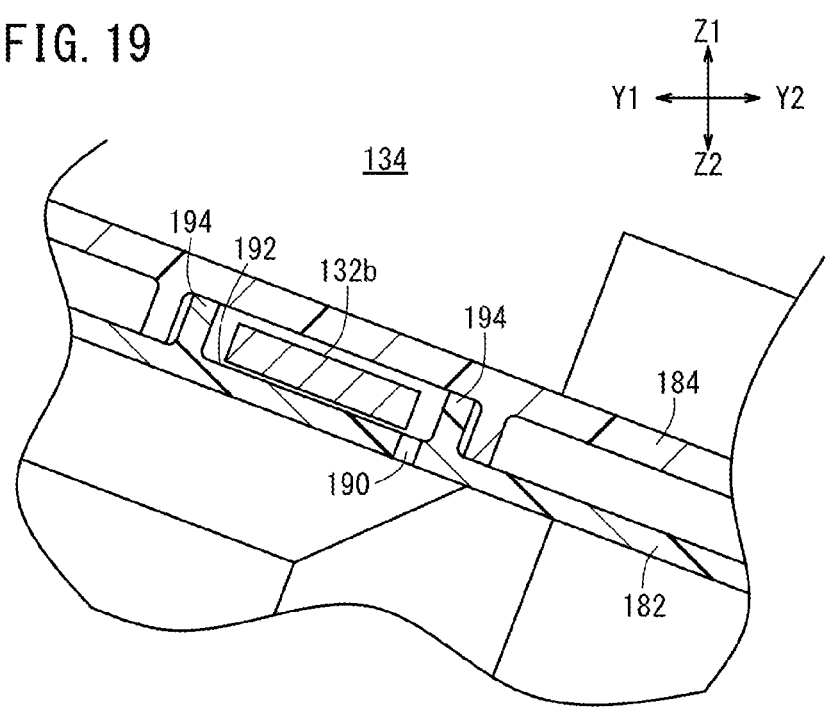
FIG. 19 is a fragmentary cross-sectional view, taken along line XIX-XIX of FIG. 16, of the insulating cover, at a position where an oil discharge port is present.

As shown in FIGS. 17 and 19, etc., the insulating cover 182 has partition walls 194 for securing the bus bars 132*a* through 132*c* and for insulating the bus bars 132*a* through 132*c* from each other.

As shown in FIGS. 18 and 19, a predetermined gap exists between the lower surfaces of the bus bars 132a through 132c and the bottom surface 192 of the insulating cover 182. Such a gap is created as a result of the bus bars 132a through 132c being fitted in the insulating cover 182, rather than being insert-molded. The gap may be created intentionally due to the shapes of the bus bars 132a through 132c, or may be created due to tolerances. If the bus bars 132a through 132c are insert-molded, then if the bus bars 132a through 132c were to become deformed due to a change in temperature, a resin that is held in intimate contact with the bus bars 132a through 132c tends to crack. However, since the gap is present between the bus bars 132a through 132c and the insulating cover 182, the bus bars 132a through 132c are allowed to become deformed, thereby preventing damage to the insulating cover 182 due to a change in temperature.

The insulating cover 182 includes the oil discharge ports 190, which are defined in the bottom surface 192 and extend vertically through the bottom surface 192. The oil discharge ports 190 are positioned at corners where the bottom surface 192 and the partition walls 194 cross each other, and in particular, the oil discharge ports 190 are disposed at corners that are positioned relatively on the lower side when the insulating cover 182 is installed. The oil discharge ports 190 are disposed on both upper and lower sides of a step that is formed on the insulating cover 182.

Furthermore, as shown in FIG. 8, etc., the oil discharge ports 190 are spaced adequately from the stator 22 along the axial direction X2, so that the oil discharge ports 190 do not impair the insulation between the stator 22 and the bus bars 132a through 132c.

The oil coolant 42, which is supplied from the side cover 30 to the motor stator 22, may potentially pass through the inside of the stator 22 into the terminal base 134. If the oil discharge ports 190 according to the present embodiment are not defined in the insulating cover 182, then the oil coolant 42 is likely to be retained on the insulating cover 182, thereby increasing the likelihood of a short circuit between the bus bars 132a through 132c, and leading to deterioration of the insulating cover 182.

According to the present embodiment, since the insulating cover 182 has the oil discharge ports 190 defined therein, the oil discharge ports 190 are effective to prevent the oil coolant 42 from being retained on the insulating cover 182.

2. Advantages of the Present Embodiment

According to the present embodiment, as described above, since the insulating cover 182 covers the portions of the lower surfaces of the bus bars 132a through 132c, it is possible to improve the insulation between the bus bars 132a through 132c and surrounding components (the coils 112 of the stator 22, etc.).

Further, since the oil discharge ports 190 (through holes) are formed in the bottom surface 192 of the insulating cover 182, the oil coolant 42 can be discharged from the oil discharge ports 190 when the oil coolant 42 enters the insulating cover 182. Accordingly, the oil coolant 42 is avoided from remaining in the insulating cover 182, and a short circuit between the bus bars 132a through 132c due to the remaining oil coolant 42 can be prevented. Also, the insulating cover 182 or the oil coolant 42 itself can be prevented from being deteriorated due to the remaining oil coolant 42.

In the present embodiment, the bus bars 132a through 132c extend from the outer circumferential side of the stator 22 along the axial direction X2, and the insulating cover 182 is disposed between the outer circumferential surface of the stator 22 and the bus bars 132a through 132c (see FIG. 4). Accordingly, the bus bars 132a through 132c can be connected to the terminals 120 of the external electric power lines 102 at positions shifted from the motor stator 22 in the axial direction X2. Therefore, the dimension of the motor 12 along the radial directions R1, R2 can be reduced, rather than a case in which the bus bars 132a through 132c are connected to the terminals 120 of the external electric power lines 102 at positions radially outward of the outer circumferential surface of the stator 22. Also, since the insulating cover 182 is disposed between the outer circumferential surface of the stator 22 and the bus bars 132a through 132c, it is possible to improve the insulation between the outer circumferential surface of the stator 22 and the bus bars 132a through 132c.

In the present embodiment, the oil discharge ports 190 are disposed at positions remote from the outer circumferential surface of the stator 22 in the axial direction X2 (see FIG. 8, etc.). Accordingly, it is possible to prevent degradation of the insulation between the outer circumferential surface of the stator 22 and the bus bars 132a through 132c due to the formation of the oil discharge ports 190.

In the present embodiment, the insulating cover 182 includes the partition walls 194, which are positioned between the bus bars 132a through 132c in plural phases. Also, the bottom surface 192 of the insulating cover 182 is inclined with respect to the horizontal plane H. Further, the oil discharge ports 190 are positioned at corners where the bottom surface 192 and the partition walls 194 cross each other. In this structure, since the bottom surface 192 of the insulating cover 182 is inclined with respect to the horizontal plane H, it is possible to dispose the insulating cover 182 along the outer circumferential surface of the stator 22. Therefore, it is possible to prevent the dimension of the motor 12 along the radial directions R1, R2 from being increased. Further, since the oil discharge ports 190 are positioned at corners where the bottom surface 192 and the partition walls 194 cross each other, the oil coolant 42 can be discharged effectively.

In the present embodiment, the bus bars 132a through 132c are formed of plate-like members (see FIG. 15, etc.), and the bus bars 132a through 132c include the bent portions 172, which are made up of portions of the plate-like members that are bent in the thicknesswise direction (the direction along the thickness of the plate). Accordingly, when there is a change in temperature, the bent portions 172 are flexed to absorb extensions and contractions of the bus bars 132a through 132c. Therefore, stresses caused in the bus bars 132a through 132c when the temperature changes are reduced, thereby preventing the bus bars 132a through 132c from becoming damaged.

B. Modifications

The present invention is not limited to the above embodiment, but various other arrangements may be employed based on the disclosed content of the present description. For example, the present invention can employ the following arrangements.

1. Objects to which the Present Invention is Applicable

In the above embodiment, the motor 12 is mounted on the vehicle 10. However, the present invention is applicable to other situations in which the motor 12 may be employed. For example, although the motor 12 is used to propel the vehicle 10 in the above embodiment, the motor 12 may be used in other applications in the vehicle 10 (e.g., an electric power steering system, an air conditioner, an air compressor, etc.). Alternatively, the motor 12 may be used on industrial machines, home electric appliances, etc.

2. Motor 12

In the above embodiment, the motor 12 is a three-phase AC motor. However, the motor 12 may be another type of AC motor or a DC motor, for example, which is cooled by a cooling fluid, or which is of a reduced size. In the above embodiment, the motor 12 comprises a brushless motor. However, the motor 12 may be a brush motor. In the above embodiment, the motor stator 22 is disposed radially outward (along the direction R1) of the motor rotor 20 (see FIG. 1, etc.). However, the motor stator 22 may be disposed radially inward of the motor rotor 20.

3. Resolver 31

In the above embodiment, the resolver rotor 24 is mounted on the first protrusive wall 82. However, the resolver rotor 24 may be fixed to another member other than the first protrusive wall 82, insofar as the oil coolant 42 is capable of being supplied from the bottom wall 70 of the tubular member 52 to the inside of the tubular member 52, or in view of the structure of the electric power system.

4. Cooling System

[4-1. Cooling Fluid]

In the above embodiment, the oil coolant 42 is used as a cooling fluid. However, rather than the oil coolant 42, another cooling fluid (e.g., water or the like) may be used from the standpoint of effecting the cooling function. However, in this case, potentially, the other cooling fluid may not be used as a lubricant for lubricating the gear mechanisms such as the planet gear 76, etc.

[4-2. Tubular Member 52]

In the above embodiment, the planet gear 76, which is coupled to the rotational shaft 50, is disposed in the tubular member 52. However, a different type of gear mechanism may be disposed in the tubular member 52. Alternatively, other members may be disposed in the tubular member 52 that are cooled by the cooling medium. For example, a frictional engagement unit (clutch mechanism), which is coupled to the rotational shaft 50, may be disposed in the tubular member 52.

By disposing a frictional engagement unit in the tubular member 52, it is possible to reduce the dimension of the motor 12 along the axial directions X1, X2. Further, in addition to cooling the rotor core 60, it also is possible to cool or lubricate the frictional engagement unit (assuming that the cooling fluid doubles as a lubricating oil). Therefore, as opposed to providing the cooling structure for the rotor core 60 and the cooling structure for the frictional engagement unit separately from each other, the structure can be made simpler.

5. Electric Power System

[5-1. Junction Conductor 104]

In the above embodiment, the junction conductor 104 is made up of the fusing members 130 and the bus bars 132*a* through 132*c*. However, the junction conductor 104 is not limited to such a structure, insofar as the terminals 120 of the external electric power lines 102 are disposed radially inward (along the direction R2) of the outer circumferential surface of the stator 22, for example. For example, the coil ends 114 and the external electric power lines 102 may be connected by either the fusing members 130 or the bus bars 132*a* through 132*c*.

Furthermore, the shapes of the fusing members 130 or the bus bars 132*a* through 132*c* may be changed, insofar as the terminals 120 of the external electric power lines 102 are disposed radially inward (along the direction R2) of the outer circumferential surface of the stator 22, for example. For example, in the above embodiment (see FIG. 4), although the bus bars 132*a* through 132*c* basically lie parallel to the axial directions X1, X2, the bus bars 132*a* through 132*c* may be inclined to the axial directions X1, X2. For example, the bus bars 132*a* through 132*c* may be inclined from an upper left position toward a lower right position in FIG. 4.

In the above embodiment, the intermediate joints 178, which connect the terminal base connecting panels 142 of the fusing members 130 and the fusing member connectors 160 of the bus bars 132*a* through 132*c*, are disposed radially outward (along the direction R1) of the outer circumferential surface of the motor stator 22. However, insofar as the terminals 120 of the external electric power lines 102 are disposed radially inward (along the direction R2) of the outer circumferential surface of the stator 22, for example, the intermediate joints 178 may also be disposed radially inward (along the direction R2) of the outer circumferential surface of the stator 22.

In the above embodiment, the respective portions of the coil joints 147 and the intermediate joints 178 are staggered mutually on circumferential planes that have the same radius as viewed from the axial direction X2 (see FIG. 10, etc.). However, insofar as the terminals 120 of the external electric power lines 102 are disposed radially inward (along the direction R2) of the outer circumferential surface of the stator 22, for example, the respective portions of the coil joints 147 and the intermediate joints 178 need not necessarily be disposed on circumferential planes having the same radius as viewed from the axial direction X2.

In the above embodiment, the coil connecting panels 140 of the fusing members 130 extend along the radial directions R1, R2 and the circumferential directions C1, C2, and the intermediate panels 144 are coupled to the coil connecting panels 140 so as to extend along the axial direction X2 and the radial direction R1 radially outward (along the direction R1) of the outer circumferential surface of the stator 22. However, insofar as the coil ends 114 and the external electric power lines 102 are connected in such a manner that the terminals 120 of the external electric power lines 102 are disposed radially inward (along the direction R2) of the outer circumferential surface of the stator 22, for example, the intermediate panels 144 may extend along the axial directions X2 and the circumferential directions C1, C2, or stated otherwise, the intermediate panels 144 may be disposed parallel to the outer circumferential surface of the stator 22, for example.

In the above embodiment, the motor 12 is coupled to the end of the speed reducer 14, and the external electric power line joint 122 is disposed closer to the speed reducer 14 than the stator 22 along the axial directions X1, X2. However, insofar as the coil ends 114 and the external electric power lines 102 are connected in such a manner that the terminals 120 of the external electric power lines 102 are disposed radially inward (along the direction R2) of the outer circumferential surface of the stator 22, for example, the external electric power line joint 122 may be disposed opposite to the speed reducer 14 across the stator 22 along the axial directions X1, X2.

In the above embodiment, the external electric power line joint 122 is disposed radially inward (along the direction R2) of the outer circumferential surface of the stator 22. However, insofar as the function of the insulating cover 182 can be fulfilled, the external electric power line joint 122 may be disposed radially outward (along the direction R1) of the outer circumferential surface of the stator 22.

[5-2. Insulating Cover 182]

In the above embodiment, the insulating cover 182 is provided for the bus bars 132a through 132c. However, insofar as the terminals 120 of the external electric power lines 102 are disposed radially inward (along the direction R2) of the outer circumferential surface of the stator 22, for example, the insulating cover 182 may be dispensed with. If the insulating cover 182 is dispensed with, then the length of the fusing members 130 along the axial direction X2 preferably is increased in order to provide insulation between the stator 22 and the bus bars 132a through 132c.

In the above embodiment, the number and layout of the oil discharge ports 190 are as shown in FIGS. 16 and 17. However, insofar as the oil coolant 42 is capable of being discharged through the oil discharge ports 190, it is sufficient to provide at least one oil discharge port 190, and the layout of the oil discharge ports 190 can be changed appropriately.

In the above embodiment, the bus bars 132a through 132c extend along the axial direction X2 from the outer circumferential side of the stator 22. However, the bus bars 132a through 132c may be positioned in a different location, insofar as insulation can be provided between the stator 22 and the bus bars 132a through 132c and the oil coolant 42 can be discharged through the oil discharge ports 190. For example, the bus bars 132a through 132c may extend radially outward (along the direction R1) from the outer circumferential surface of the stator 22. Further, the insulating cover 182 may be disposed between the bus bars 132a through 132c and the outer circumferential surface of the stator 22.

In the above embodiment, the insulating cover 182 includes the partition walls 194, which are positioned in plural phases between the bus bars 132a through 132c. However, the partition walls 194 may be dispensed with, insofar as sufficient insulation can be provided between the stator 22 and the bus bars 132a through 132c, and the oil coolant 42 can still be discharged through the oil discharge ports 190.

In the above embodiment, the bottom surface 192 of the insulating cover 182 is inclined with respect to the horizontal plane H. However, the bottom surface 192 may lie parallel to the horizontal plane H, insofar as sufficient insulation can be provided between the stator 22 and the bus bars 132a through 132c, and the oil coolant 42 can still be discharged through the oil discharge ports 190.

In the above embodiment, the bus bars 132a through 132c include the bent portions 172, which are made up of portions of the plate-like members that are bent in the thicknesswise direction. The number or layout of the bent portions 172 may be changed, or the bent portions 172 may be dispensed with, insofar as sufficient insulation can be provided between the stator 22 and the bus bars 132a through 132c, and the oil coolant 42 can still be discharged through the oil discharge ports 190.

The invention claimed is:

1. A rotary electric machine comprising:
a stator with coils in a plurality of phases wound thereon;
a housing that houses the stator therein;
a plurality of bus bars configured to electrically join the coils in the plurality of phases and external electric power lines to each other, the external electric power lines disposed outside of the housing;
an insulating cover attached to the bus bars with gaps between the bus bars and the insulating cover, and configured to cover at least portions of lower surfaces of the bus bars; and
a coolant supply unit configured to supply a cooling fluid for cooling the stator to the inside of the housing,
wherein a through hole is defined in a bottom surface of the insulating cover and extends vertically through the bottom surface, and
wherein the through hole is disposed at a position remote from an outer circumferential surface of the stator in an axial direction of the rotary machine.

2. The rotary electric machine according to claim 1, wherein the bus bars extend from an outer circumferential side of the stator along the axial direction, and
the insulating cover is disposed between the outer circumferential surface of the stator and the bus bars.

3. The rotary electric machine according to claim 1, wherein the insulating cover includes a partition wall positioned between the bus bars,
the bottom surface of the insulating cover is inclined with respect to a horizontal plane, and
the through hole is positioned at a corner where the partition wall and the bottom surface cross each other.

4. The rotary electric machine according to claim 1, wherein the bus bars are formed of plate-like members, and
each of the bus bars includes a bent portion, which is made up of a portion of the plate-like member that is bent in a direction along thickness of the plate-like member.

5. The rotary electric machine according to claim 1, wherein one of the bus bars includes a stepped portion, which is formed in a height direction, and
the through holes of the insulating cover are formed on upper and lower sides of the stepped portion.

6. The rotary electric machine according to claim 1, wherein the insulating cover comprises a lower cover that covers the lower surfaces of the bus bars, and
the insulating cover is coupled to an upper cover that covers upper surfaces of the bus bars.

7. The rotary electric machine according to claim 1, wherein the bus bars extend from an outer circumferential side of the stator inward or outward with respect to the axial direction, and
the insulating cover is disposed between the outer circumferential surface of the stator and the bus bars.

8. A rotary electric machine comprising:
a stator with coils in a plurality of phases wound thereon;
a housing that houses the stator therein;
a plurality of bus bars configured to electrically join the coils in the plurality of phases and external electric power lines to each other, the external electric power lines disposed outside of the housing;
an insulating cover attached to the bus bars with gaps between the bus bars and the insulating cover, and configured to cover at least portions of lower surfaces of the bus bars; and
a coolant supply unit configured to supply a cooling fluid for cooling the stator to the inside of the housing,
wherein a through hole is defined in a bottom surface of the insulating cover and extends vertically through the bottom surface,
wherein one of the bus bars includes a stepped portion, which is formed in a height direction, and
the through hole of the insulating cover includes an upper through hole disposed on the upper side of the stepped portion and a lower through hole disposed on the lower side of the stepped portion.

9. The rotary electric machine according to claim 8, wherein the bus bars extend from an outer circumferential side of the stator along an axial direction of the rotary electric machine, and the insulating cover is disposed between an outer circumferential surface of the stator and the bus bars.

10. The rotary electric machine according to claim 8, wherein the insulating cover includes a partition wall positioned between the bus bars, the bottom surface of the insulating cover is inclined with respect to a horizontal plane, and the through hole is positioned at a corner where the partition wall and the bottom surface cross each other.

11. The rotary electric machine according to claim 8, wherein the bus bars are formed of plate-like members, and each of the bus bars includes a bent portion, which is made up of a portion of the plate-like member that is bent in a direction along thickness of the plate-like member.

12. The rotary electric machine according to claim 8, wherein the insulating cover comprises a lower cover that covers the lower surfaces of the bus bars, and the insulating cover is coupled to an upper cover that covers upper surfaces of the bus bars.

13. A rotary electric machine comprising:

a stator with coils in a plurality of phases wound thereon;

a housing that houses the stator therein;

a plurality of bus bars configured to electrically join the coils in the plurality of phases and external electric power lines to each other, the external electric power lines disposed outside of the housing;

an insulating cover attached to the bus bars with gaps between the bus bars and the insulating cover, and configured to cover at least portions of lower surfaces of the bus bars; and a coolant supply unit configured to supply a cooling fluid for cooling the stator to the inside of the housing, wherein a through hole is defined in a bottom surface of the insulating cover and extends vertically through the bottom surface, wherein the insulating cover includes a partition wall positioned between the bus bars, the bottom surface of the insulating cover is inclined along a direction which intersects an extending direction of the partition wall extending along the bus bars, the bottom surface being inclined with respect to a horizontal plane, and the through hole is positioned at a corner where the partition wall and the bottom surface cross each other, the corner being located on the upper side of the partition wall.

* * * * *